United States Patent
Shringi (10) Patent No.: US 11,765,240 B1
(45) Date of Patent: Sep. 19, 2023

(54) DISTRIBUTED PUBLICATION/SUBSCRIPTION AS A SERVICE COMPUTING SYSTEM

(71) Applicant: Bank of America Corporation, Charlotte, NC (US)

(72) Inventor: Dheeraj Shringi, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 18/058,107

(22) Filed: Nov. 22, 2022

(51) Int. Cl.
*H04L 67/125* (2022.01)
*H04L 67/147* (2022.01)
*H04L 67/145* (2022.01)

(52) U.S. Cl.
CPC .......... *H04L 67/147* (2013.01); *H04L 67/125* (2013.01); *H04L 67/145* (2013.01)

(58) Field of Classification Search
CPC .... H04L 67/125; H04L 67/145; H04L 67/147
See application file for complete search history.

(56) References Cited

U.S. PATENT DOCUMENTS

| | | |
|---|---|---|
| 6,854,123 B1 | 2/2005 | Lewallen |
| 8,375,051 B2 | 2/2013 | Postlethwaite et al. |
| 8,429,238 B2 | 4/2013 | Lobban et al. |
| 8,843,580 B2 | 9/2014 | Beardsmore et al. |
| 9,811,395 B1 | 11/2017 | Greenwood et al. |
| 11,481,553 B1* | 10/2022 | Durvasula ............. G06F 40/279 |
| 2005/0273499 A1 | 12/2005 | Goodman et al. |
| 2006/0036679 A1 | 2/2006 | Goodman et al. |
| 2008/0033845 A1 | 2/2008 | McBride et al. |
| 2010/0257242 A1* | 10/2010 | Morris ................. G06F 16/958 719/330 |
| 2019/0041830 A1* | 2/2019 | Yarvis ................. G06F 11/2023 |
| 2022/0343250 A1* | 10/2022 | Tremblay ......... G06Q 10/06316 |

OTHER PUBLICATIONS

"Messaging with Goodie Cloud Pub/Sub", https://spring.io/guide/gs/messageing-gdp-pubsub/, visisted on Sep. 23, 2022, pp. 10.
"What is Azure Web PubSub service?", https://learn.microsoft.com/en-us/azure/azure-web-pubsub/overview, visisted on Sep. 23, 2022, pp. 3.

* cited by examiner

*Primary Examiner* — Frantz B Jean
(74) *Attorney, Agent, or Firm* — Banner & Witcoff, Ltd.

(57) ABSTRACT

A technology agnostic distributed publication subscription as a service (DPAAS) server-based environment is used as a wrapper for abstracting technology, protocol and/or vendor specific implementations of publication/subscriber functionality. Users may interface with the DPAAS system an application programming interface to connect and/or disconnect, subscribe and unsubscribe from different publication/subscriber services. Further, selection of underlined technology, protocol and/or other vendor specific solutions can be facilitated by leveraging a self-service onboarding portal. Applications register to the DPAAS, along with any underlying technologies used by the source service, so that communications may be seamless to the end user of the subscribing application. In doing so, the DPAAS solution is vendor, protocol, and/or technology independent. Users of the applications do not need in-depth knowledge of how each application publishes and/or subscribes to data feeds, and migrating applications from one vendor solution or platform to another may be accomplished in an easy, quick and seamless manner.

20 Claims, 5 Drawing Sheets

DISTRIBUTED PUBLICATION/SUBSCRIPTION AS A SERVICE COMPUTING SYSTEM

BACKGROUND

A publisher/subscriber system (or "pub/sub" system) is an effective way of disseminating information from applications or other "publishers" to multiple consumer applications or "subscribers." A publisher generates messages, also referred to as events, which contain a topic and some data content. A subscriber, also referred to as a "client," provides, ahead of time, a criterion, also referred to as a subscription, that specifies the information, based on published messages, that the messaging system delivers to that subscriber client in the future. In a pub/sub system, publishers and subscribers are anonymous in that publishers do not necessarily know the number of subscribers or their locations; and subscribers do not necessarily know the locations of the publishers.

The publisher/subscriber solution is very much rooted in certain technologies, vendor product, and/or protocol specific, where switching between solutions requires an overhaul and/or rewriting of a complete solution. Additionally, provisioning of necessary hardware and/or software components, along with changes in application code also costs time and money and often involves a large investment in manpower. As such, changes to the pub/sub solution leads to an increase in time to market and also sometime requires learning of new technologies, purchasing and installing additional vendor products and/or implementing a new protocol which may or may not be compatible to the existing technology base.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes providing a technology agnostic distributed publication subscription as a service functionality.

Aspects of the disclosure relate to computer hardware and software. In particular, one or more aspects of the disclosure generally relate to computer hardware and software for communicating information between applications and, more specifically, to a technology agnostic distributed publication subscription as a service wrapper and interface.

In some cases a pub/sub pattern may provide compatibility between topics and/or channels where all interested parties (e.g., applications) can subscribe for an interest list and may receive message notifications. Many disparate vendor products may provide publication/subscription capacity, but may not be compatible between different technologies, protocols and/or vendor specific uses. As such, switching between solutions is often a difficult process and may not be seamless because of required rewriting of the communication code base, learning of new technologies and protocols, and/or provisioning necessary technology components.

To address this problem, a need has been recognized for a technology agnostic distributed publication subscription as a service (DPAAS) functionality. The DPAAS functionality may be implemented within a server-based environment through creation of one or more heterogenous language specific libraries that may be used as a wrapper for abstracting technology, protocol and/or vendor specific implementations. Users may interface with the DPAAS system via different interfaces (e.g., an application programming interface (API)) to connect and/or disconnect, subscribe and unsubscribe from different publication/subscriber services. Further, selection of underlined technology, protocol and/or other vendor specific solutions can be facilitated by leveraging a self-service onboarding portal. Users may register applications to the DPAAS, along with any underlying technologies used by the source service, so that communications may be seamless to the end user of the subscribing application. In doing so, the DPAAS solution is vendor, protocol, and/or technology independent. Users of the applications do not need in-depth knowledge of how each application publishes and/or subscribes to data feeds, and migrating applications from one vendor solution or platform to another may be accomplished in an easy, quick and seamless manner.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Real-time notifications are a commonly requested capability for application based communications, and may be facilitated in the form of a publication/subscription model. Thus, building the pub/sub model with horizontal capability and standardized interfaces improves use of the model in a plug and play environment.

In some cases, publication/subscription notification capabilities may be available on one or more cloud-computing platforms (PaaS), however interfacing and set-up remains difficult and problematic. As such, a need for a reliable locality-based solution that simplifies the onboarding experience for application developers, while providing a simple technology agnostic publication and subscription framework. In some cases, applications may user asynchronous tools to provide libraries and/or pub/sub technologies server-side and/or client-side. However, leveraging the existing pub/sub technologies based on current asynchronous communication tools fails to provide confidence in execution capabilities for all types of production workloads. For example, some use cases require point to point push messaging while others require broadcast messages. Open source asynchronous tools, such as SignalR is not efficient for point to point use cases. Other technologies require on-demand short lived connections while others require always-on long running connections. Further, delivery order and/or delivery guarantee requirements also may vary (e.g., at least once, only once, and the like). Further, technology tools, such as SignalR, depend on structured query language (SQL) server backplanes. Other options may be available; however these libraries work best with an SQL server. As such, these asynchronous libraries are not horizontally scalable due to these limitations with SQL. Further, the backplane may cause a performance bottle-neck. As such, the need was recognized for the distributed publication/subscription as a service computing system described herein.

The DPAAS computing system provides a real-time, and scalable, notification system using publication/subscription model. For example, the DPAAS computing system provides ordered and guaranteed deliveries as configured via an onboarding process. Further, DPAAS supports point to point communications as well as broadcast communications. Further, on-the-fly topics may be automatically handled on an as-needed basis. The DPAAS computing system may include a metadata application programming interface (API) to act as a facilitator and/or navigator for configuration driven provider selection. Further, clients may connect via plug and play standardized abstractions, which may provide a direct connection to provider core functionality to avoid the metadata API from causing bottle necks. The DPAAS system may include an onboarding interface to facilitate self-onboarding procedures when new technologies are to be interfaced. This onboarding process is performed at a high level, with the connections being automatically handled while providing plug and play functionality.

Illustrative use cases for the DPAAS publication/subscription functionality includes a first use case comprising point to point messaging that includes using unique identifiers for every peer. Here, a persisted bootstrapped connection may facilitate moderate to high volume traffic with real-time or near real-time communications. Illustrative examples includes application alerts messaging (e.g., malicious programming detection alert messages) or advanced threat protection (ATP) notifications. Here, a distributor server or tele-gateway server may be connected to a client, which may allow for alternate instant messaging program usage. A second user case may be associated with topic based broadcast messaging to all subscribers without a delivery guarantee and/or with multicast capabilities. A persisted bootstrapped connection may be enabled with support for occasional burst traffic. Such connections may provide for real time or near real-time communications. For example, these connections may be used by smart agent applications for sending alert messages that may currently be handled by existing asynchronous communication libraries. A third use case may correspond to on-the-fly topic based communications, with 1-to-1 or 1-to-many messaging and/or on-demand connection capabilities. Such connections may be short lived (e.g., up to one hour) and may be associated with session-based communications. Such messaging may be performed via real-time messaging connections. Such messaging may be used for on-demand real-time messaging communications for applications, but may currently be supported by one or more software communication libraries.

Further considerations may include scalability of the solution to provide sufficient flexibility to support vertical scaling where required. Horizontal scaling may be included based on a multi-node clustering set-up. The DPAAS computing system provides resilience to failures based on numerous failover and failback safety measures. For example, operation may be supported via multi-region cluster replications and/or with single region stretch clusters. Additionally, the DPAAS computing system provides traffic management and load balancing via near real-time data replication and ensuring consistency across clusters. Latency for communications is minimized to ensure real-time or at least near real-time communications as required. For example, a maximum latency for the system may be less than 50 milliseconds. DC affinity may be based on geolocation of clients and/or may be supported for server-to-server subscription/publication instances. Further, the DPAAS computing system may provide failover preferences based on latency parameters, which may be configurable during the onboarding process and/or via pre-defined or reprogrammable parameters. Throughput characteristics of the DPAAS computing system may be optimized for small (e.g., tens of words) data size per messages. Additionally, high performance may also be capable even during high volume (e.g., messaging volume, data size, and the like), and/or during burst scenarios.

Figure 1A:
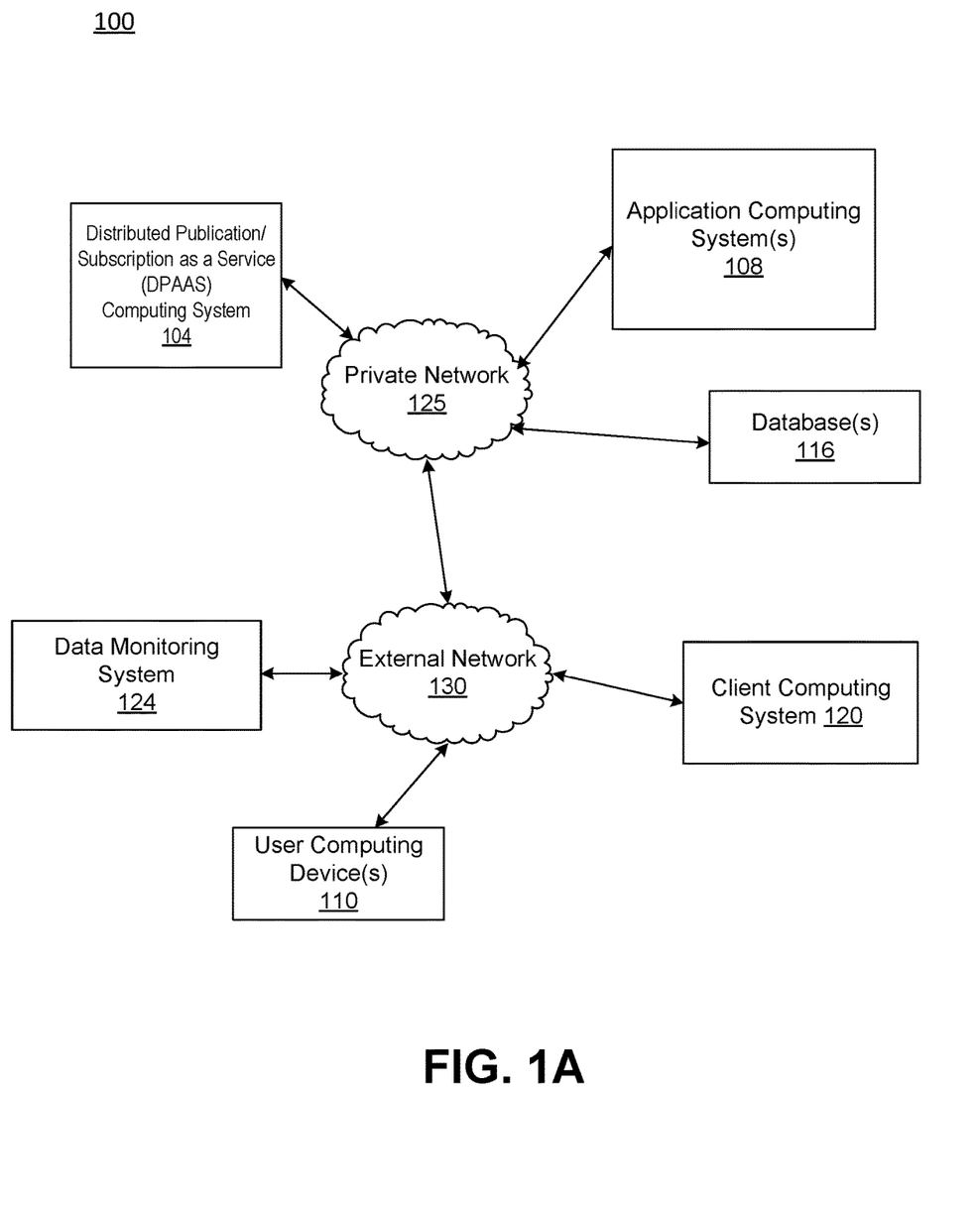
FIG. 1A shows an illustrative computing environment for a technology agnostic distributed publication subscription as a service system, in accordance with one or more aspects described herein.

FIG. 1A shows an illustrative computing environment 100 for a technology agnostic distributed publication subscription as a service system, in accordance with one or more arrangements. The computing environment 100 may comprise one or more devices (e.g., computer systems, communication devices, and the like). The computing environment 100 may comprise, for example, a distributed publication/ subscription as a service (DPAAS) computing system 104, one or more application system 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the DPAAS computing system 104 as being incorporated within a separate computing system, the DPAAS computing system 104 system may be implemented within one or more different computing systems, such as one or more of the application computing systems 108.

The DPAAS computing system 104 may comprise one or more computing devices and/or other computer components (e.g., processors, memories, communication interfaces) configured to perform one or more functions as described herein, such as and including facilitating onboarding technologies, mapping and/or facilitating communications via a communications framework. Further details associated with the architecture of the DPAAS computing system are described with reference to FIG. 1B.

The application computing systems 108 and/or the client system 120 may comprise one or more computing devices and/or other computer components (e.g., processors, memories, communication interfaces). In addition, the application computing systems 108 and/or the client system 120 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing system 120 may be configured to communicate with one or more of the application systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, computing security applications, and/or other programs associated with the financial institution. The application computing systems 108 and/or the client system 120 may comprise various servers and/or databases that store and/or otherwise maintain account information, such as financial account information including account balances, transaction history, account owner information, and/or other information. In addition, the application computing systems 108 and/or the client system 120 may process and/or otherwise execute transactions on specific accounts based on commands and/or other information received from other computer systems comprising the computing environment 100. In some cases, one or more of the application computing systems 108 and/or the client system 120 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing systems may provide computing security functionality. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the DPAAS computing system 104 and/or the Application computing systems 108. For example, the database(s) 116 may store application information, communications mapping information, metadata information, and the like. In an arrangement, the database(s) 116 may be used for other purposes as described herein. In some cases, the client computing system 120 may write data or read data to the database(s) 116 via the services.

In one or more arrangements, the DPAAS computing system 104, application computing systems 108 and/or the client system 120, the user devices 110, and/or the other devices/systems in the computing environment 100 may be any type of computing device capable of receiving input via a user interface, and communicating the received input to one or more other computing devices in the computing environment 100. For example, the DPAAS computing system 104, application computing systems 108 and/or the client system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the DPAAS computing system 104, application computing systems 108 and/or the client system 120, the user devices 110, and/or the other devices/systems in the computing environment 100 may, in some instances, be and/or comprise special-purpose computing devices configured to perform specific functions.

Figure 1B:
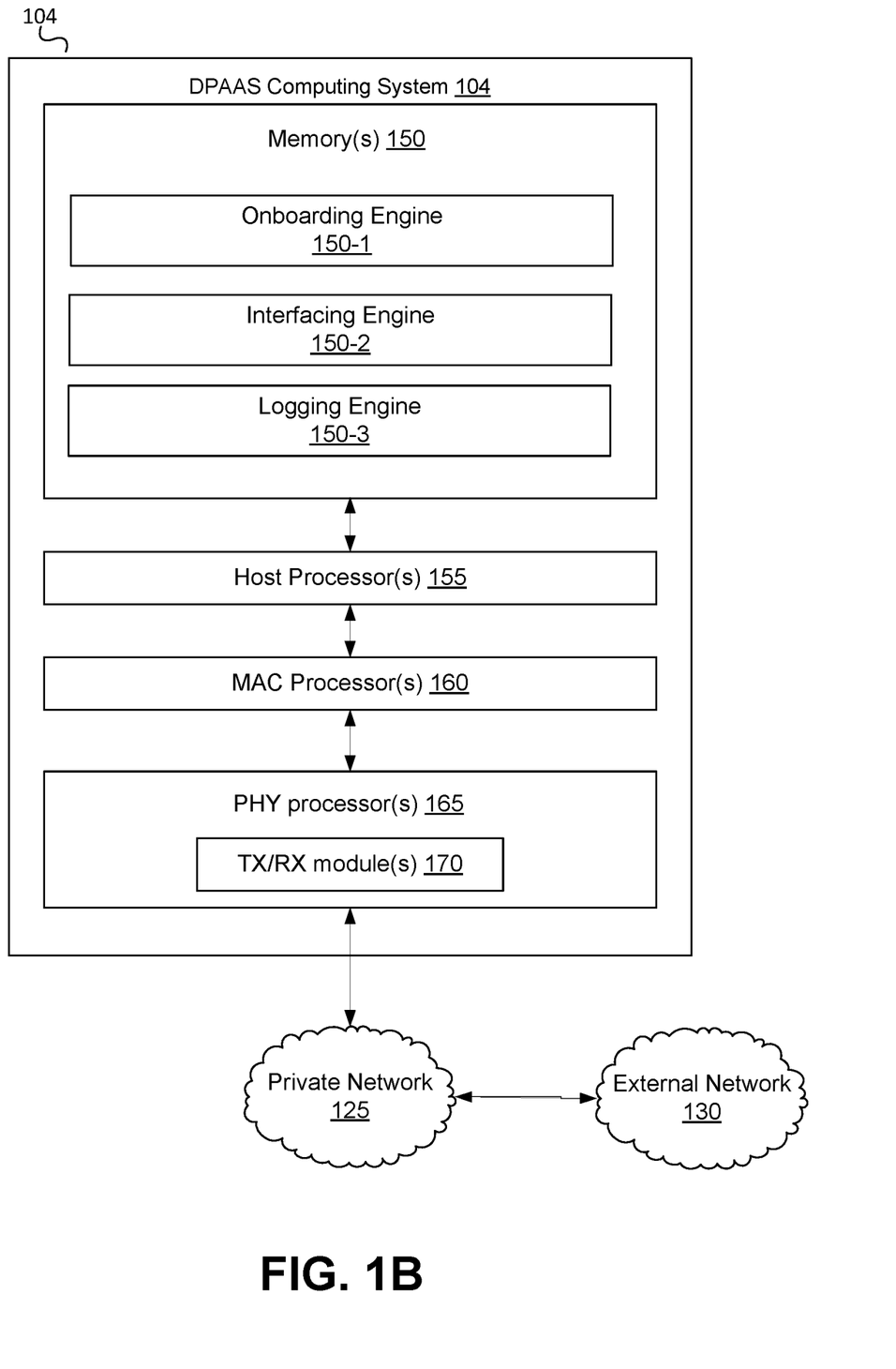
FIG. 1B shows an illustrative computing platform enabled for the technology agnostic distributed publication subscription as a service, in accordance with one or more aspects described herein.

FIG. 1B shows an illustrative technology agnostic distributed publication subscription as a service device in accordance with one or more examples described herein. The DPAAS computing system 104 may be a stand-alone device and/or may at least be partial integrated with the DPAAS computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The DPAAS computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the DPAAS computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the DPAAS computing system 104 may be configured to execute machine readable instructions stored in memory 150. The memory 150 may comprise (i) one or more program modules/engines having instructions that when executed by the one or more processors cause the DPAAS computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the DPAAS computing system 104 and/or by different computing devices that may form and/or otherwise make up the DPAAS computing system 104. For example, the memory 150 may have, store, and/or comprise a onboarding engine 150-1, an interfacing engine 150-2, a logging engine 150-3 and/or the like. The onboarding engine 150-1 may have instructions that direct and/or cause the DPAAS computing system 104 to perform one or more operations associated with onboarding publication/subscription technologies, such as open source communication libraries, vendor specific libraries and/or the like. The interfacing engine 150-2 may have instructions that may cause the DPAAS computing system 104 to using the onboarding information to synchronize communication libraries within a framework to enable plug and play operation of the publication and subscription services based on an underlying technology. The logging engine 150-3 may have instructions that may cause the DPAAS computing system 104 to log information corresponding to onboarding and publication/subscription services to enable statistical views and/or troubleshooting of the DPAAS operation.

While FIG. 1A illustrates the DPAAS computing system 104, and/or the application computing systems 108, as being separate elements connected in the private network 125, in one or more other arrangements, functions of one or more of the above may be integrated in a single device/network of devices. For example, elements in the DPAAS computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
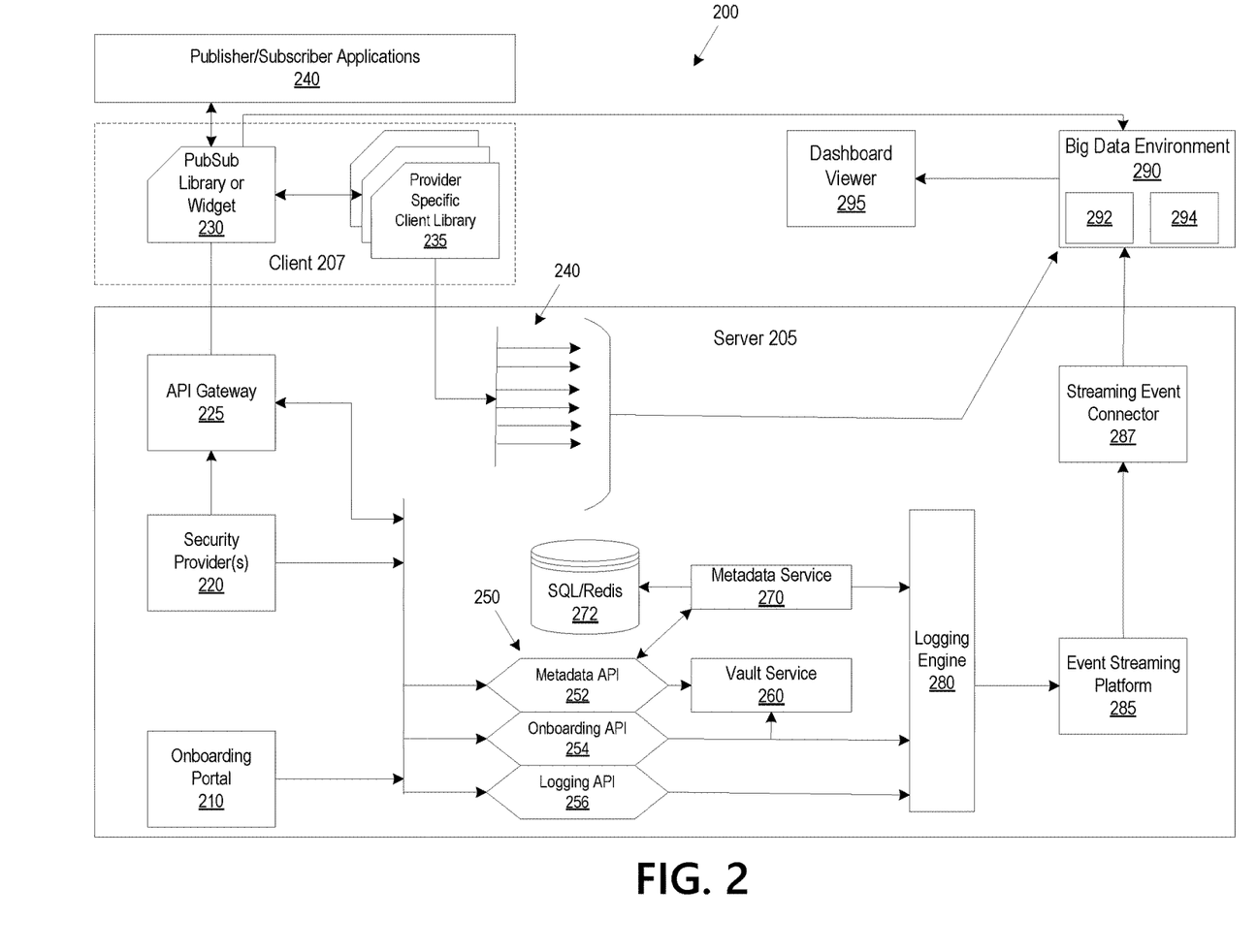
FIG. 2 shows an illustrative DPAAS system in accordance with one or more aspects described herein.

FIG. 2 shows an illustrative DPAAS system 200 in accordance with one or more aspects described herein. For example, the illustrative DPAAS system 200 may include a server 205 (e.g., a DPAAS server), one or more client devices (e.g., a client device 207), and one or more publisher/subscriber applications 240. The server 205 may include an onboarding portal module 210, a security module 220, an API gateway module 225 that may be communicatively coupled to an API module 250 that may include one or more sub-modules associated with different API functionality, such a metadata API module 252, an onboarding API module 254, and a logging API 256. The metadata API module may communicate with a vaulting service 260 and/or a metadata service 270 which may further include a data repository (e.g., an SQL based metadata mapping data repository). The metadata API via the metadata service 270, the onboarding API 254, and the logging API 256 may communicate with a logging engine 280 to facilitate logging of onboarding activities, aligning of metadata between technology bases, identifying a technology base from metadata, and the like. The logging engine 280 may communicate via an event streaming platform 285 to communicate data to a big data environment 290 that may include a big data repository 292 (e.g., a cloud-based big data repository), a big data analysis platform 294, and the like. A dashboard viewer 295 may include one or more user interface screens that may be observable via a browser on a user device for troubleshooting, viewing, and/or other analysis of the information logged by the DPAAS system.

The client device(s) 207 may include a publication/subscription (pub/sub) library or widget 230 and may include one or more provider specific communication libraries 235 that may be used by the publisher/subscriber applications 240. For example, each provider specific client library 235 may be implemented in one or more of the publisher/subscriber applications 240 to facilitate publication and/or subscription activities. The pub/sub library 230 may be include a client library and/or a widget that may be a window to the DPAAS service for the publishing and/or producing applications and the subscriber and/or consumer applications. For example, the pub/sub library 230 may provide universal and/or standard functionality (e.g., connect, disconnect, reconnect/automatic reconnect, connection state, publish, publish success, subscribe, receive, and/or the like). In some cases, the pub/sub library 230 may correspond to a client specific technology (e.g., a .NET library, a JavaScript/Angular BUIC, and/or the like). Further, the pub/sub library 230 may use one or more vendor provided libraries (e.g., a provider specific library) and, therefore, may serve as a universal adapter to abstract the provider specific implementation differences between different publishing and/or subscribing applications. Additionally, the pub/sub library 230 may coordinate with the metadata API with preparation for making actual connections and preparing for remote logging.

As mentioned, the client device 207 may include one or more provider specific client libraries 235 corresponding to a particular vendor and/or a vendor product (e.g., an Apache Kafka client library, a SignalR client library, and/or the like). These client libraries 235 may be technology specific, for example a .NET library is different than a JavaScript library, and so on. The client libraries provide core functionality specific to the associated provider platform (e.g., Kafka, RabbitMQ, SignalR, and the like). In some cases, the pub/sub library 230, once configured to use a correct API via the API gateway 225, may automatically interact with functions specific to particular provider-specific client library 235. For example, functions to facilitate publication and or subscription functionality may be called by a particular application 240, where the pub/sub library or widget may be configured via the API gateway 225 so that a wrapper function is routed to one or more provider specific functions to perform the desired action, such as by calling the functions associated with a correct technology base of the multiple supported technology bases corresponding to the publisher/subscriber applications 240.

An onboarding module may be incorporated within the onboarding portal 210, or may be implemented separately to communicate with the onboarding portal 210. Based on use cases, tenant applications may need to be onboarded into the DPAAS system to use specific provider technology. For example, many different technology options may be available for use within the DPAAS, where the mappings may be maintained on the server 205. The onboarding module offers functionality through a user interface portal 210 with APIs and/or services configured to assist with onboarding and/or profiling applications such as by a use case, technology vendor, application type and the like.

The metadata API 252 may be leveraged to read an identify of a requesting application and assist the client library in connecting to the intended provider core. In some cases, this may be accomplished by dynamically providing provider uniform resource locator (URL). Additionally, the metadata API 252 may be used to provide an endpoint to publish messages, such as in cases where auditing, enriching, and/or encryption is required. Such cases may include messages that cannot be published directly to the provider. The onboarding API 254 may interact with the onboarding portal 210, the onboarding module, and/or one or more onboarding APIs to configure and/or log technology requirements for particular publisher/subscriber applications 240. The logging API 256 may include functions to assist with logging communications, configurations, and/or other information to the big data environment 290.

Figure 3:
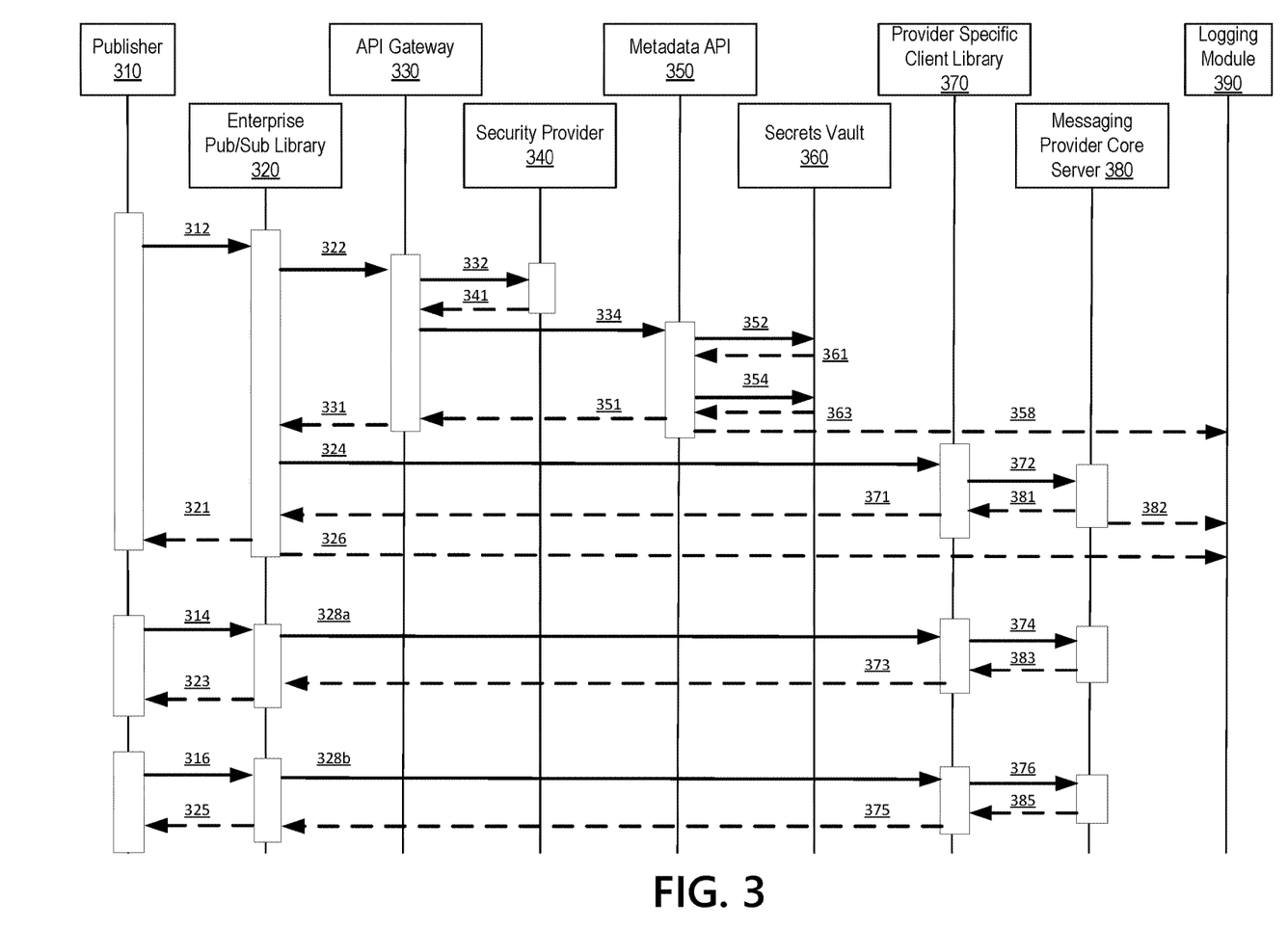
FIG. 3 show an illustrative process of a publisher sequence, in accordance with one or more aspects described herein.

FIG. 3 show an illustrative process of a publisher sequence, in accordance with one or more aspects described herein. In the illustrative publisher sequence, the DPAAS system may include a publishing application (e.g., the publisher 310), an enterprise pub/sub library 320, an API gateway 330, a security provider 340, a metadata API 350, a secrets vault 360, a provider specific client library 370, a messaging provider core server 380, and a logging module 390. As can be seen, the publisher application 310 interacts with the DPAAS API via the enterprise pub/sub client library 320 such as via a common format request, where the publication request may then be automated via the DPAAS system such that the publisher application may complete the publication request seamlessly via the technology agnostic framework, where the technology specific function calls may be handled without reprograming the API interface in the publisher application. As such, if an underlying technology base is changed, the publisher application 310 may use the same function calls, but the new technology base functionality may be added via the onboarding module so that the publication sequence remains seamless to the publishing application 310.

A publish sequence may start at 312 with a connection request from the publishing application 310 to the enterprise pub/sub library 320. At 322, the enterprise pub/sub library 320 may request the provider connection information, such as by calling a get provider function via the API gateway 330. At 332, the API gateway 330 may initiate user verification and/or the application identity by the security provider 340. If the user verification and/or the application identity is correct, the security provider 340 responds back to the API gateway with an authenticated response at 341. If authentication fails, an error may be issued and may be returned to the publisher application 310 via the enterprise pub/sub client library 320. At 334, following an authentication response, the API gateway 330 may initiate a get provider call via the metadata API 350. At 352, the metadata API 350 may authorize the user and/or application identifier in a secrets vault 360 and, upon successful authorization at 361, the metadata API 350 may imitate a get function to get a provider id URL request and/or an authorization token or certificate at 354, which may be returned from the secrets vault at 363. The metadata API may then log success or failure of the authentication request and/or successful return of the requested information via the logging module 390, at 358.

At 351, the metadata API 350 may return the provider URL, the identification information, and the authorization token or certificate to the API gateway 330. At 331, the API gateway 330 returns the provider URL, the identification information, and the authorization token or certificate to the enterprise pub/sub client library 320, which then may use this information when requesting a connection via the provider specific client library 370, at 324. At 372, the provider specific client library 370 is used to send a connection request to the messaging provider core server 380, with a successful connection response being returned to the provider specific client library function at 381, where the messaging provider core server 380 may log success or failure of the connection request via the logging module 390 at 382. At 371, the provider specific client library 370 may return success or failure of the connection request (e.g., a successful connection message to the enterprise pub/sub client library 320, which then may return a success (as illustrated) or failure of the connection request at 321 to the publisher application 310. The enterprise pub/sub client library 320 may also log the connection response information via the logging module 390 at 326.

At 314, the publisher application 310 may initiate creation of a topic (e.g., a create topic function call) via the enterprise pub/sub client library 320. At 328a, the enterprise pub/sub client library 320 calls the create topic function via the provider specific client library 370. Because the correct technology base was identified via the verification stage above, the enterprise pub/sub client library 320 is configured to utilize the correct library for the configured technology base associated with the publisher application 310. At 376, the create topic request is sent to the messaging provider core server 380, with a response being returned at 383. At 375, the function called via the provider specific client library 370 returns the response to the create topic request (e.g., a "created" affirmative response, an error, and the like), to function called from the enterprise pub/sub client library 320, which then returns the response to the publisher application 310 at 323. Similarly, when the publishing application 310 publishes information, the request is made via a function call at 316 via a publish function of the enterprise pub/sub client library 320 is mapped to the corresponding technology specific function of the provider specific client library 370 at 328b. At 376, the publish function is called to publish the information via the messaging provider core server 380, with a response being returned at 385. The response (e.g., a published response, an error, and the like) is returned via the function of the provider specific client library 370 at 375 to the calling function of the enterprise pub/sub client library 320, which is then returned to the publishing application 310 at 325.

Figure 4:
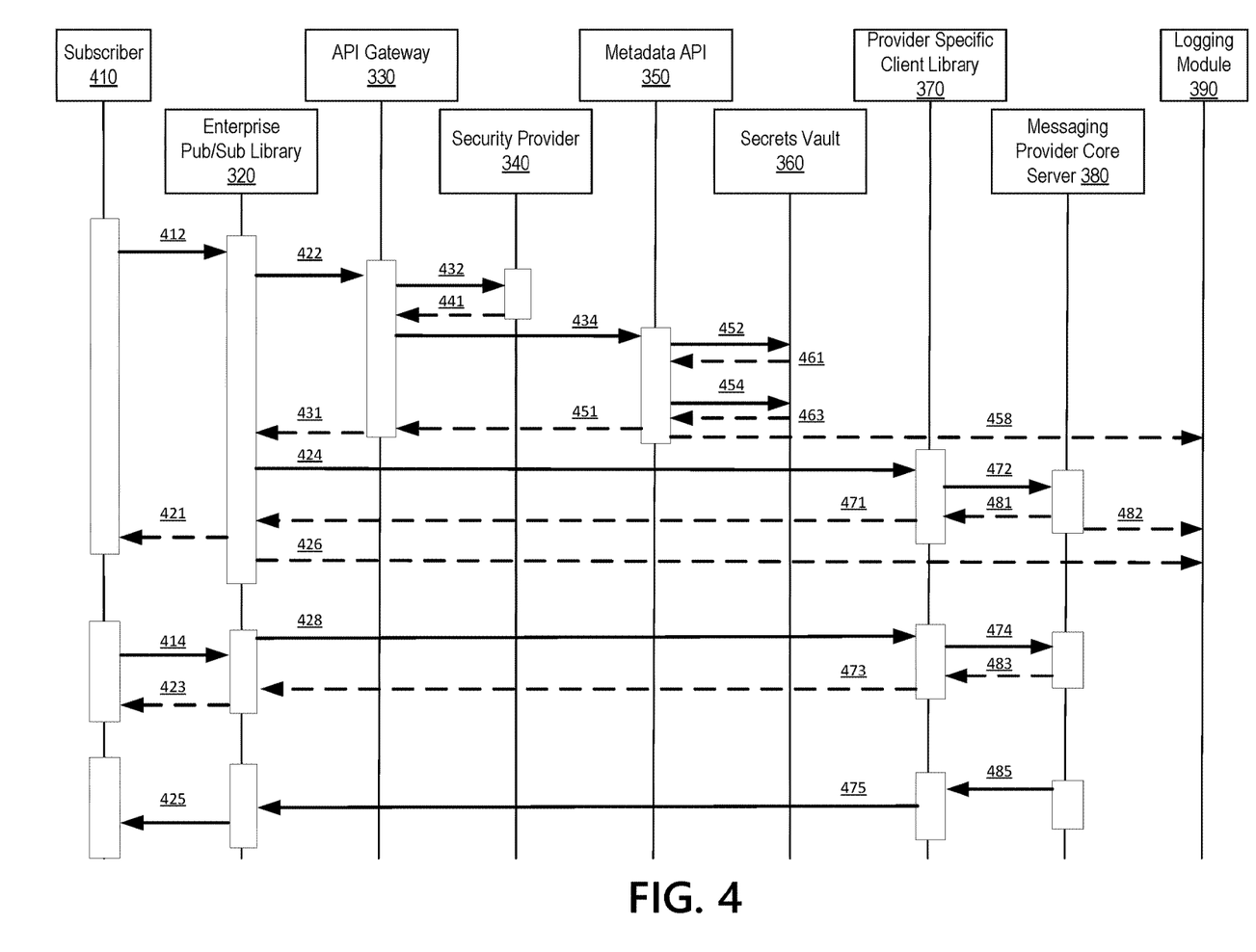
FIG. 4 shows an illustrative subscriber sequence in accordance with one or more aspects described herein.

FIG. 4 shows an illustrative subscriber sequence in accordance with one or more aspects described herein. In the illustrative publisher sequence, the DPAAS system may include a subscriber application (e.g., the subscriber 410), an enterprise pub/sub library 320, an API gateway 330, a security provider 340, a metadata API 350, a secrets vault 360, a provider specific client library 370, a messaging provider core server 380, and a logging module 390. As can be seen, the subscriber application 410 interacts similarly with the DPAAS API via the enterprise pub/sub client library 320 such as via a common format request, where the subscription request may then be automated via the DPAAS system such that the subscriber 410 may complete the subscription request seamlessly via the technology agnostic framework, where the technology specific function calls may be handled without reprograming the API interface in the subscriber application. As such, if an underlying technology base is changed, the subscriber application 410 may use the same function calls, but the new technology base functionality may be added via the onboarding module so that the subscription sequence remains seamless to the subscriber application 410.

A subscription sequence may start at 412 with a connection request from the subscriber application 410 to the enterprise pub/sub library 320. At 422, the enterprise pub/sub library 320 may request the provider connection information, such as by calling a get provider function via the API gateway 330. At 432, the API gateway 330 may initiate user verification and/or the application identity by the security provider 340. If the user verification and/or the application identity is correct, the security provider 340 responds back to the API gateway with an authenticated response at 441. If authentication fails, an error may be issued and may be returned to the publisher application 310 via the enterprise pub/sub client library 320. At 434, following an authentication response, the API gateway 330 may initiate a get provider call via the metadata API 350. At 452, the metadata API 350 may authorize the user and/or application identifier in a secrets vault 360 and, upon successful authorization at 361, the metadata API 350 may imitate a get function to get a provider id URL request and/or an authorization token or certificate at 454, which may be returned from the secrets vault at 463. The metadata API may then log success or failure of the authentication request and/or successful return of the requested information via the logging module 390, at 458.

At 451, the metadata API 350 may return the provider URL, the identification information, and the authorization token or certificate to the API gateway 330. At 431, the API gateway 330 returns the provider URL, the identification information, and the authorization token or certificate to the enterprise pub/sub client library 320, which then may use this information when requesting a connection via the provider specific client library 370, at 424. At 472, the provider specific client library 370 is used to send a connection request to the messaging provider core server 380, with a successful connection response being returned to the provider specific client library function at 481, where the messaging provider core server 380 may log success or failure of the connection request via the logging module 390 at 482. At 471, the provider specific client library 370 may return success or failure of the connection request (e.g., a successful connection message to the enterprise pub/sub client library 320, which then may return a success (as illustrated) or failure of the connection request at 421 to the subscriber application 410. The enterprise pub/sub client library 320 may also log the connection response information via the logging module 390 at 426.

At 414, the subscriber application 310 may initiate a subscription to a topic (e.g., a subscribe topic function call) via the enterprise pub/sub client library 320. At 428, the enterprise pub/sub client library 320 calls the subscribe topic function via the provider specific client library 370. Because the correct technology base was identified via the verification stage above, the enterprise pub/sub client library 320 is configured to utilize the correct library for the configured technology base associated with the publisher application 310. At 474, the subscribe topic request is sent to the messaging provider core server 380, with a response being returned at 483. At 473, the function called via the provider specific client library 370 returns the response to the subscribe topic request (e.g., a "subscribed" affirmative response, an error, and the like), to function called from the enterprise pub/sub client library 320, which then returns the response to the subscriber application 410 at 423. Similarly, when the subscriber application 410 receives subscribed data, the process may initiate with the originating message may be sent by the messaging provider core server (e.g., sending published information to one or more subscribing applications, e.g., an onpublish function, a push function, and the like) at least once, and exactly one delivery per subscriber. The pushed data may be received via a API function defined in the provider specific client library 370, where the response is returned to the enterprise pub/sub client library 320, at 475 with the subscribed information being provided to the subscriber application 410 at 425.

For specific use cases, the functionality in the pub/sub client library 320 may support different messaging functionality supported by a particular technology base and/or the provider specific client library 370, such as short lived messaging, long lived messaging, broadcast messaging, point to point messaging, topic on the fly messaging, read only subscriber messaging, and/or the like. Additionally, certain technology bases may support horizontal scalability, such as via a sharding plugin, with partitions, with shards, via cloud platform as a service functionality, via multi node clusters, and the like. Resiliency of the DPAAS system may support multiple configuration, replications of partitions, stretch clusters across DCs, multi region cluster replication support, manual handling via client code per connection, and the like. In some cases, the DPAAS may support real time messaging, near real time messaging, low latency messaging and the like. Further, the DPAAS may support high throughput requirements, very high throughput situations that may be optimized for small messages, good throughout, and, in some cases, low to medium throughput.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a host computing platform hosting at least one first service publishing information to a network and/or a second service subscribing to one or more information services;
a distributed publication/subscription (pub/sub) as a service (DPAAS) computing platform, comprising:
at least one processor; and
memory storing computer-readable instructions that, when executed by the at least one processor, cause the DPAAS computing platform to:
receive, via an onboarding interface, a configuration of a first pub/sub library;
map, by the onboarding interface, functions of a DPAAS library to corresponding functions of the first pub/sub library as a first DPAAS mapping;
receive, via a DPAAS library engine, a publication request from the first service;
initiate, between the host computing platform and a messaging server, a communication connection via the first DPAAS mapping; and
publish, via the DPAAS mapping by the first service and based on a confirmed connection between the host computing platform and the messaging server, a first topic.

2. The system of claim 1, wherein the instructions that, when executed by the at least one processor, cause the DPAAS computing platform to:
receive, via the onboarding interface, a configuration of a second pub/sub library;
map, by the onboarding interface, functions of the DPAAS library to corresponding functions of the second pub/sub library as a second DPAAS mapping;
receive, via the DPAAS library engine, a subscription request from the second service;
initiate, between the host computing platform and a messaging server, a communication connection via the first DPAAS mapping; and
subscribe, via the DPAAS mapping by the first service and based on a confirmed connection between the host computing platform and the messaging server, to a requested topic.

3. The system of claim 2, wherein the first pub/sub library is different from the second pub/sub library.

4. The system of claim 2 wherein the first pub/sub library is incompatible with the second pub/sub library.

5. The system of claim 4, wherein the requested topic comprises the first topic.

6. The system of claim 4, wherein the requested topic is a second topic different from the first topic.

7. The system of claim 5, wherein the instructions that, when executed by the at least one processor, cause the DPAAS computing platform to:
log, via a logging service to a big data repository, confirmation of a successful subscription to the requested topic.

8. The system of claim 1, wherein the instructions that, when executed by the at least one processor, cause the DPAAS computing platform to:
log, via a logging service to a big data repository, confirmation of a successful creation to the first topic.

9. A method comprising:
receiving, via an onboarding interface, a configuration of a first pub/sub library;
mapping, by an onboarding portal, functions of a distributed publication/subscription (pub/sub) as a service (DPAAS) library to corresponding functions of the first pub/sub library as a first DPAAS mapping;
receiving, via a DPAAS library engine, a publication request from a first service;
initiating, between a host computing platform and a messaging server, a communication connection via the first DPAAS mapping; and
publishing, via the DPAAS mapping by the first service and based on a confirmed connection between the host computing platform and the messaging server, a first topic.

10. The method of claim 9, further comprising:
receiving, via the onboarding interface, a configuration of a second pub/sub library;
mapping, by the onboarding interface, functions of the DPAAS library to corresponding functions of the second pub/sub library as a second DPAAS mapping;
receiving, via the DPAAS library engine, a subscription request from a second service;
initiating, between the host computing platform and a messaging server, a communication connection via the first DPAAS mapping; and
subscribing, via the DPAAS mapping by the first service and based on a confirmed connection between the host computing platform and the messaging server, to a requested topic.

11. The method of claim 10, wherein the first pub/sub library is different from the second pub/sub library.

12. The method of claim 10, wherein the first pub/sub library is incompatible with the second pub/sub library.

13. The method of claim 12, wherein the requested topic comprises the first topic.

14. The method of claim 12, wherein the requested topic is a second topic different from the first topic.

15. The method of claim 14, further comprising logging, via a logging service to a big data repository, confirmation of a successful subscription to the requested topic.

16. The method of claim 9, further comprising logging, via a logging service to a big data repository, confirmation of a successful creation to the first topic.

17. Non-transitory computer readable media storing instructions that, when executed by a processor, cause a DPAAS computing platform to:
receive, via an onboarding interface, a configuration of a first publication/subscription (pub/sub) library;
map, by the onboarding interface, functions of a DPAAS library to corresponding functions of the first pub/sub library as a first DPAAS mapping;
receive, via a DPAAS library engine, a publication request from a first service;
initiate, between a host computing platform and a messaging server, a communication connection via the first DPAAS mapping; and
publish, via the DPAAS mapping by the first service and based on a confirmed connection between the host computing platform and the messaging server, a first topic.

18. The non-transitory computer readable media of claim 17, wherein the instructions cause a distributed publication/subscription (pub/sub) as a service (DPAAS) computing platform to:
- receive, via the onboarding interface, a configuration of a second pub/sub library;
- map, by the onboarding interface, functions of the DPAAS library to corresponding functions of the second pub/sub library as a second DPAAS mapping;
- receive, via the DPAAS library engine, a subscription request from a second service;
- initiate, between the host computing platform and a messaging server, a communication connection via the first DPAAS mapping; and
- subscribe, via the DPAAS mapping by the first service and based on a confirmed connection between the host computing platform and the messaging server, to a requested topic.

19. The non-transitory computer readable media of claim 17, wherein the first pub/sub library is different from a second pub/sub library.

20. The non-transitory computer readable media of claim 17, wherein the first pub/sub library is incompatible with a second pub/sub library.

* * * * *